Nov. 28, 1933.  O. F. ROHWEDDER ET AL  1,937,248

ROTARY SLICER

Filed Jan. 17, 1930   5 Sheets-Sheet 1

INVENTOR
Otto F. Rohwedder
BY Harvey F. Elliott
Evans & McCoy
ATTORNEYS

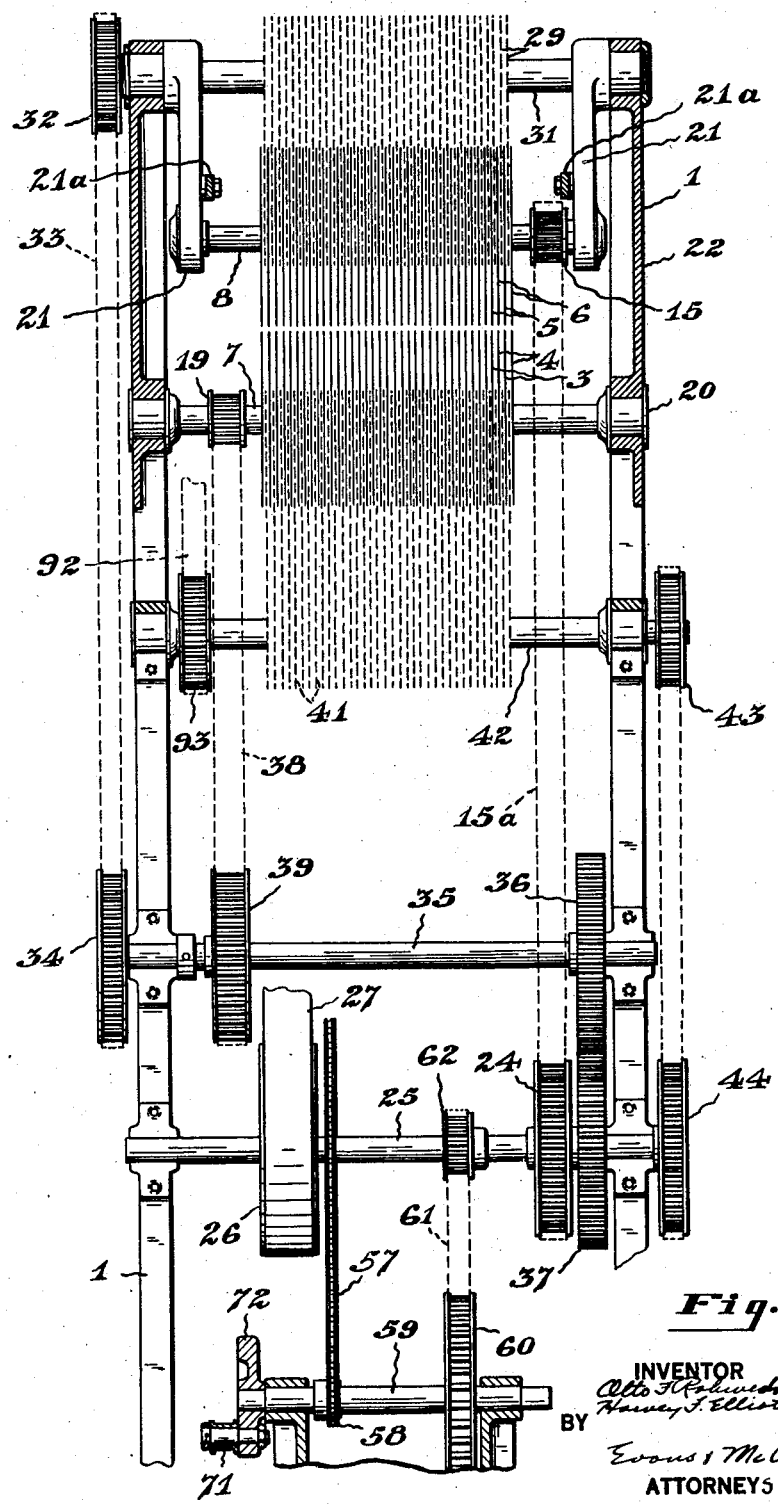

Nov. 28, 1933.  O. F. ROHWEDDER ET AL  1,937,248
ROTARY SLICER
Filed Jan. 17, 1930   5 Sheets-Sheet 4
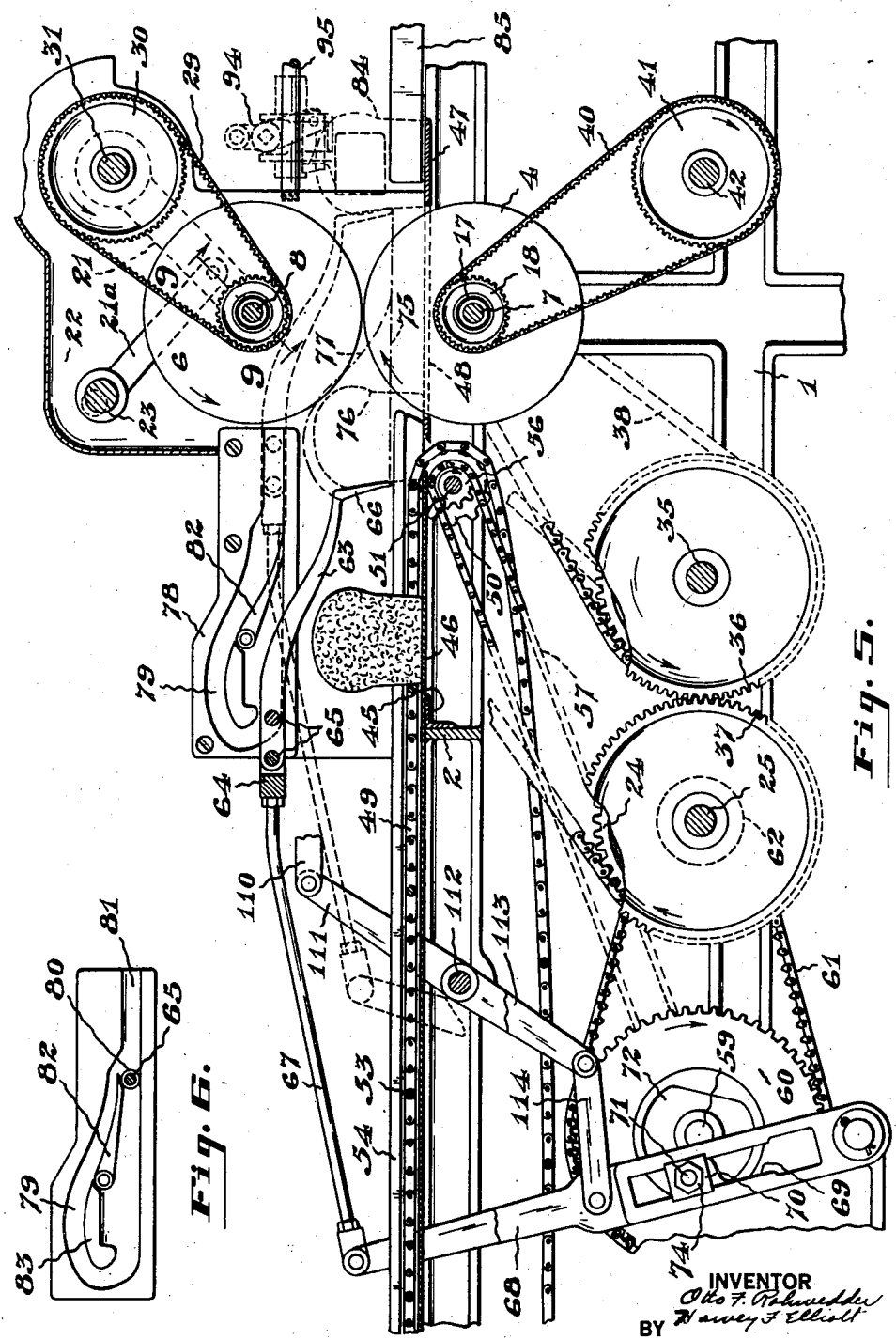

Nov. 28, 1933. O. F. ROHWEDDER ET AL 1,937,248
ROTARY SLICER
Filed Jan. 17, 1930 5 Sheets-Sheet 5

INVENTOR
Otto F. Rohwedder
Harvey F. Elliott
BY
Evans & McCoy
ATTORNEYS

Patented Nov. 28, 1933

1,937,248

UNITED STATES PATENT OFFICE 1,937,248

ROTARY SLICER

Otto F. Rohwedder, Davenport, Iowa, and Harvey F. Elliott, Cleveland, Ohio, assignors, by mesne assignments, to The Micro Corporation, Bettendorf, Iowa, a corporation of Delaware Application January 17, 1930. Serial No. 421,428

9 Claims. (Cl. 146—98)

This invention relates to slicing machines and particularly to slicing machines employing a plurality of rotary cutters.

One of the objects of the present invention is to provide a slicing machine of new and improved design wherein articles can be sliced with greater rapidity than has been the practice heretofore.

Another object is to provide a slicing machine having a plurality of cutters wherein adjacent cutters rotate in opposite directions so that relatively resilient articles such as baked bread and cake can be neatly and efficiently sliced without crushing.

Another object is to provide a slicing machine which can be satisfactorily operated in conjunction with a wrapping machine.

A further object is to provide a slicing machine with a new and novel means for taking the sliced articles from the slicing cutters and automatically placing them on the feeding device of a wrapping machine.

A still further object is to provide a slicing machine having a plurality of rotary cutters with new and improved means for feeding the articles to be sliced to the cutters.

With the above and other objects in view, the present invention may be said to comprise the apparatus as illustrated in the accompanying drawings to be hereinafter described and particularly set forth in the appended claims, together with such variations and modifications thereof as will be apparent to one skilled in the art to which this invention appertains.

The present invention contemplates, in general, a new and improved type of slicing machine particularly adapted to slice baked bread, and which embodies two series of spaced rotary cutting blades, the adjacent blades in each series being rotatable in opposite directions. The series of rotary cutters are spaced a small distance apart so that the slices of the sliced article will be connected together by narrow portions, which portions can be easily broken as the slices are removed.

The present invention further contemplates a unique means for feeding the article being sliced through the cutters onto a delivery table where the article is automatically transferred to the feed apron of a suitable article wrapping machine.

In the drawings which illustrate a suitable embodiment of the present invention, Figure 1 is a plan view showing the slicing machine connected with a wrapping machine.

Fig. 4 is an enlarged sectional view taken substantially on the line 4—4 of Fig. 2.

Fig. 5 is an enlarged longitudinal section taken substantially on the line 5—5 of the slicing machine shown in Fig. 3.

Fig. 6 is an enlarged side elevation of the cam plate which guides the pusher device as the articles being sliced are fed to the rotary cutters.

Figure 1:
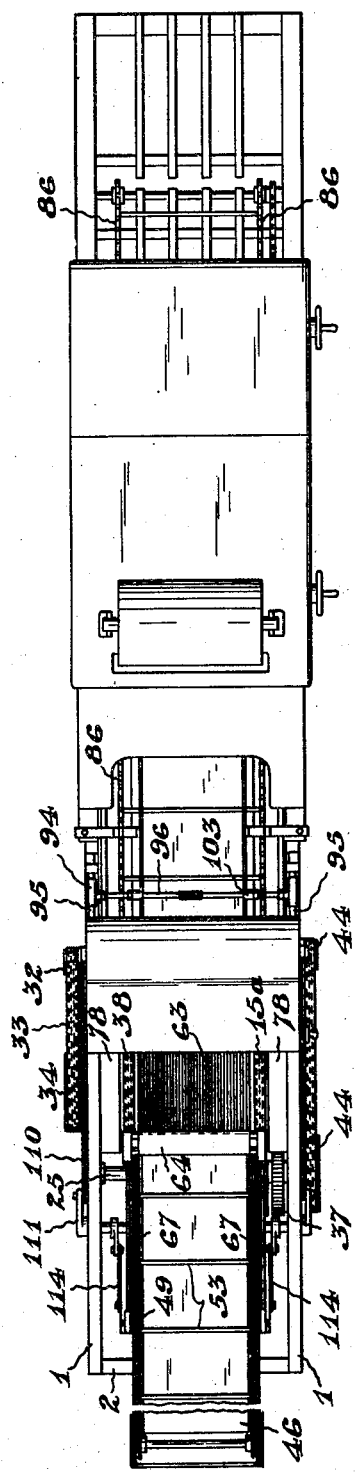

Referring to the accompanying drawings in which like numerals refer to like parts throughout the several views, the slicing machine is supported upon a suitable framework comprising side frames 1 having interconnecting cross braces 2.

The slicing mechanism comprises a lower series of rotary cutters 3 and 4, the cutters 3 being adapted to rotate in one direction, and the cutters 4 being adapted to rotate in the opposite direction, and an upper series of rotary cutters 5 and 6, also arranged to operate in opposite directions. The cutters in one series operate in the same plane as the corresponding cutters in the other series, and are preferably spaced a small distance therefrom so that the slices of the material being cut will be joined to the next adjacent slices by narrow strips, which can be easily broken when the individual slices are removed.

Figure 3:
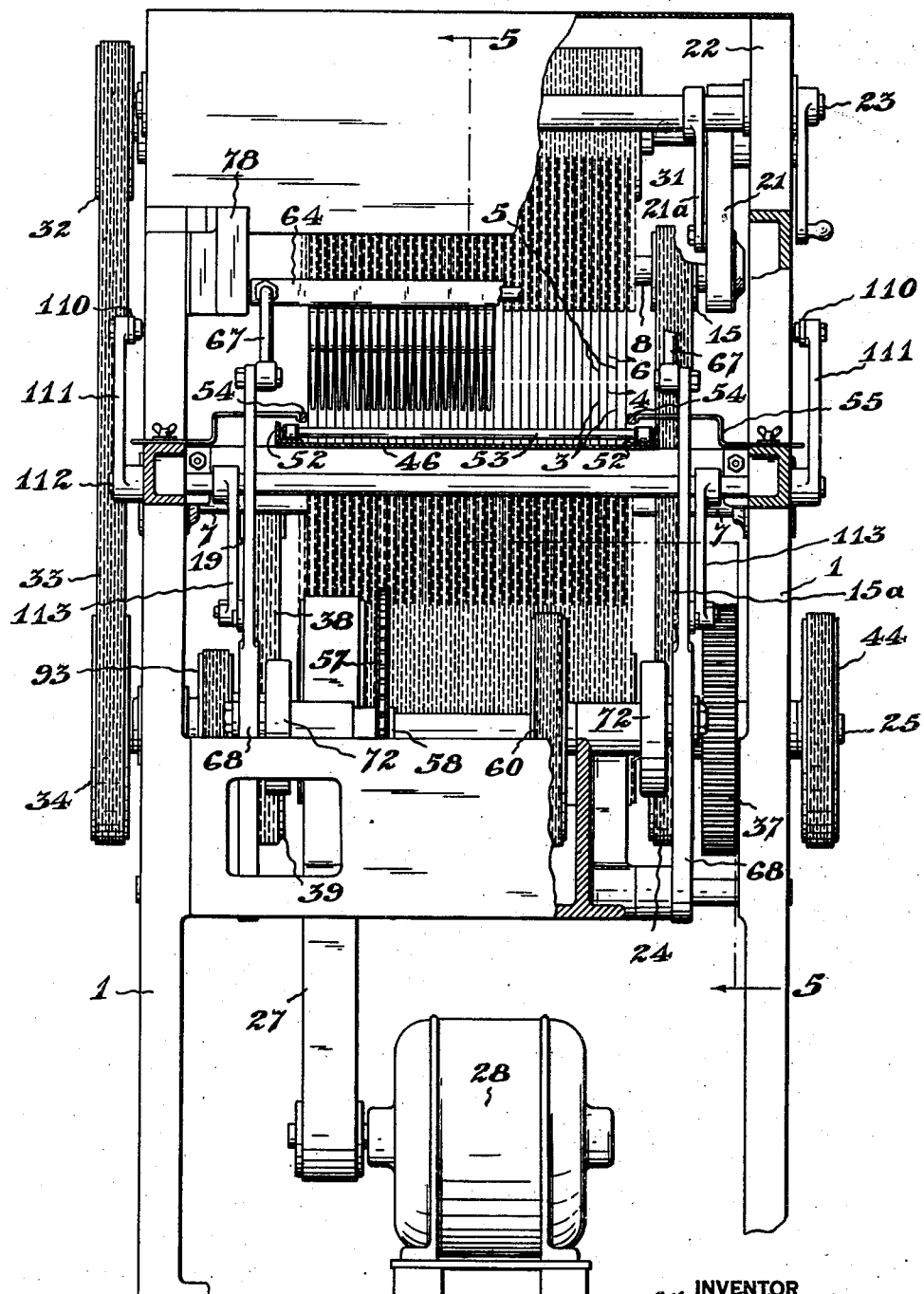
Fig. 3 is an enlarged transverse section of the slicing machine taken on the line 3—3 of Fig. 2.
Figure 9:
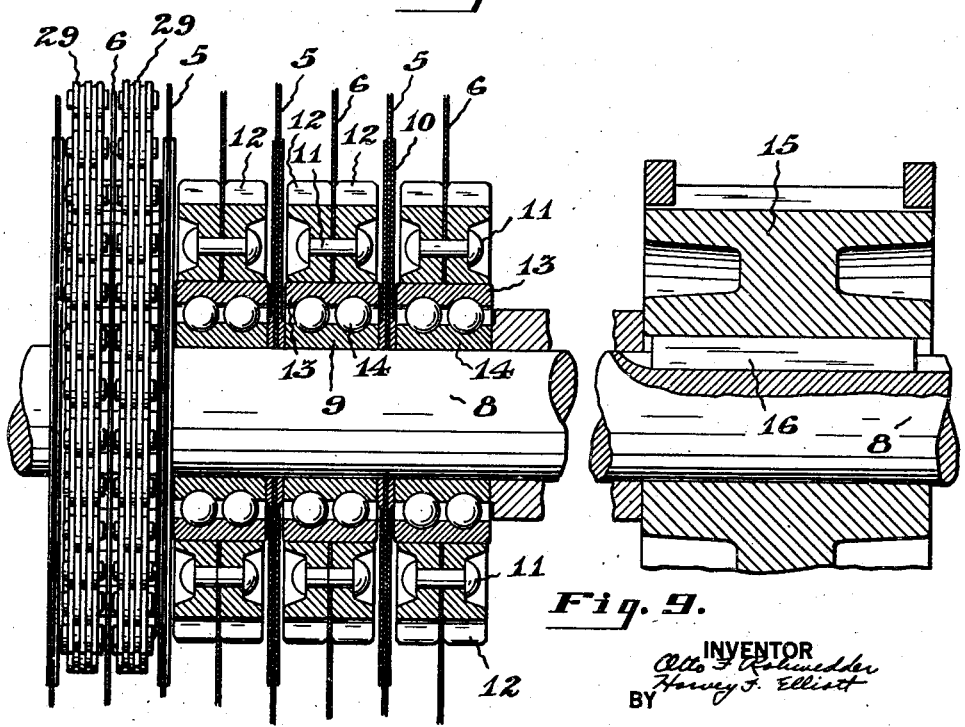
Fig. 9 is an enlarged fragmentary sectional view taken substantially on the line 9—9 of Fig. 5 showing the method of mounting the rotary cutter blades.

The lower and upper series of cutters are mounted on transversely extending shafts 7 and 8 respectively, the operating mechanism of which will now be described. Referring to Figs. 3, 5 and 9, and particularly to Fig. 9 which is a fragmentary sectional view of the upper series of cutters, the cutters 5 are preferably positively driven by the shaft 8, and are mounted thereon between the inner races 9 of suitable ball bearings. Suitable spacer plates 10 are interposed between the races 9 and the cutters 5, and the races 9 are driven onto the shaft 8 with a rigid press fit so that the cutters 5 are securely clamped therebetween and held against rotary or longitudinal movement relative to the shaft 8. The other cutters 6, as shown in Fig. 9, are interposed between the cutters 5 and are secured by rivets 11 to a pair of chain sprockets 12. The chain sprockets 12 and the cutters 6 interposed therebetween are driven onto the outer races 13 for the ball bearings 14 with a press fit so that the cutters 6 can rotate independently of and in a direction opposite to the cutters 5. The shaft 8 has a suitable chain sprocket 15 rigidly secured to one of its ends by a suitable key 16.

The lower series of cutters 3 and 4 are mounted on the shaft 7 in the same manner as the cutters 5 and 6 just described, the cutters 3 being driven directly by the shaft 7 and the cutters 4 being mounted on the roller bearings 17 and driven by chain sprockets 18. The shaft 7, like the shaft 8, is provided with a chain sprocket 19 rigidly secured to one of its ends.

The shaft 7, as shown, is journaled in bearings 20 carried by the side frames 1, but the shaft 8 is journaled at its end to a pair of arms 21, these arms 21 being pivotally secured to a shaft 31 to be later described, and being further carried by links 21a which are secured to the upright frame extensions 22 by suitable adjusting devices such as the eccentric shaft 23, so that the entire upper series of cutters 5 and 6 can be moved relative to the lower series to regulate the spacing therebetween. By adjusting the spacing between the series of cutters, the narrow portions of the article connecting the individual slices can be made to the desired thickness.

The shaft 8 for the upper series of cutters is preferably driven by means of a chain 15a of the link belt type meshing with the sprocket 15 and with a drive sprocket 24 which is mounted on a shaft 25. The shaft 25 extends transversely of the frame, it being journaled in bearings carried by the side frames 1 and being driven by a pulley 26 and belt 27 from a suitable motor 28.

This shaft 8, as before described, drives the cutters 5 in one direction, the cutters 6 being rotated in the opposite direction. The cutters 6 are driven in this opposite direction preferably by a plurality of link belts 29 engaging the sprockets 12 and suitable drive sprockets 30 which are securely mounted on a tranvsersely extending shaft 31 journaled in the side frame extensions 22. The shaft 31 is driven by a sprocket 32 through the medium of a chain or belt 33 which meshes with a corresponding sprocket 34, the sprocket 34 being mounted on a shaft 35 journaled in the side frames 1. This shaft 35 is preferably provided with a gear 36 which meshes with and is driven by a gear 37 secured to the drive shaft 25.

Hence it is seen that the shaft 25 drives the rotary cutters 5 in one direction and the shaft 35 drives the cutters 6 in the opposite direction so that adjacent cutters rotate in opposite directions.

The lower series of cutters are actuated in a similar manner, the shaft 7 for driving the cutters 3 being driven by a link belt 38 from a sprocket 39 mounted on the shaft 35, and the sprockets 18 for the rotary cutters 4 being driven through the medium of suitable link belts 40 by sprockets 41 mounted on a shaft 42, which shaft is preferably driven by a link belt 43 from a sprocket 44 mounted on the drive shaft 25.

Arrows have been shown in Fig. 5 on the different rotating parts and, from the same and the foregoing description, it can readily be seen that all the cutters 4 and 6 lying in the same planes rotate in opposite directions and that all the cutters 3 and 5 lying in the same planes while rotating in opposite directions relative to each other, respectively rotate in opposite directions with respect to the cutters 4 and 6 aforesaid. It is obvious, however, that each pair of cutters 4 and 6 or 3 and 5 may be made to operate in the same relative direction as the occasion demands, by merely changing the driving hookup. In any event, it can be seen that the adjacent cutters in each series rotate in opposite directions which substantially eliminates crushing of the article being sliced.

It is preferable to use driving means of the so-called link belt or chain belt type because such driving means can be operated with a minimum amount of noise and can be operated without slippage. It is obvious, however, that conventional belts or suitable gearing may be employed if desired.

Referring to Figs. 3 and 5, the frame cross members 2 are provided with angle members 45 to which a suitable apron 46 covering the top of the frame is secured. This apron 46 extends over the feed side of the machine and extends up to a point adjacent the lower series of cutters. The delivery side of the machine is also provided with a suitable apron 47 which is formed with portions 48 extending between the cutters 3 and 4 and connected together adjacent the apron 46, but in spaced relationship with respect thereto to permit the feed conveyor to operate therebetween.

The articles to be sliced are fed to the rotary cutters over the apron 46 by means of a conveyor which preferably comprises a pair of spaced endless link chains 49 adapted to be driven by sprockets 50 mounted on rotatable shafts 51 at opposite ends of the apron 46. The chains 49 forming the upper half of the conveyor preferably are guided by and slide along spaced angle bars 52 extending longitudinally of the apron 46.

Suitable cross bars 53 are provided to extend between the chains to engage the articles to be sliced and progressively move the same to the rotary cutters.

Longitudinal side guides 54 are also provided to extend longitudinally of the apron 46 and are supported by adjustable brackets 55 so that they can be correctly positioned to centrally position the articles to be sliced with respect to the conveyor and to the cutter blades.

The forward conveyor shaft 51 is provided with a sprocket 56 which carries a chain or belt 57 that is driven by a sprocket 58 mounted on a conveyor drive shaft 59. The conveyor drive shaft 59 preferably is provided with a gear or sprocket 60 which is driven by a suitable chain 61 from a drive sprocket 62 mounted on the main drive shaft 25.

It is obvious, therefore, that the main drive shaft 25 causes the rotary cutters to rotate at a relatively high speed and causes the feed conveyor to move toward the cutters at a relatively slow speed to move the articles to be sliced up to a position where they are engaged by the rotary cutters.

The present invention also contemplates a novel means for feeding the articles being sliced through the cutters onto the delivery table 47. This is accomplished by a pusher arrangement which comprises a plurality of relatively long arms 63 mounted upon a transversely extending crossbar 64 by suitable bolts 65, and being adapted to extend between the cutters 3, 4, 5, and 6.

These arms 63 are formed with depending fingers 66 at their forward ends to engage the rear face of the article being sliced, and are adapted to reciprocate forwardly and rearwardly to move the article being sliced through and beyond the cutters onto the delivery table 47.

The reciprocating movement is imparted to the arms 63 by suitable linkage comprising a pair of spaced rods 67 secured thereto and pivoted at their rearward ends to pivoted levers 68, the levers 68 being hinged to the side frames 1 adjacent the ends of the conveyor drive shaft 59. The levers 68 are formed with longitudinal rectangular openings 69 which receive sliding blocks 70 that are pivotally mounted on eccentric pins 71 carried by disk members 72 secured to the conveyor shaft 59. Rotation of the shaft 59 rotates the pins 71 about the shaft as an axis and causes the blocks 70 to slide in the guide slots 69 and thereby impart a reciprocating movement to the pusher arms 63. The sliding blocks 70 are held in position on the pins 71 and within the guide slots 69 by suitable nuts 74 threaded onto the pins 71.

The pusher fingers 66 in making their forward movement through the cutters move in a horizontal direction, as indicated by the broken line 75 shown in Fig. 5, but on their return movement they must clear the top of the following article which, as represented in Fig. 5, is a loaf of bread 76, and in making such movement, the ends thereof follow along the broken line 77.

This movement of the pusher is imparted by suitable cam plates 78 which are secured to the side frame extensions 22 and provided with grooves 79 therein of the shape necessary to give the to and fro movement indicated by the lines 75 and 77. The ends of one of the bolts 65 which hold the arms 63 in position are provided with rollers 80 which follow in the cam grooves 79 and positively guide the pusher. The groove 79 makes a sweeping movement and the two portions thereof terminate in a single horizontal groove 81 at the forward end of the plate, which groove 81 is, in fact, a continuation of the lower portion of the groove 79. Each cam plate 78 is provided with a gate portion 82 hinged at one end to the portion 83 lying between the two portions of the groove 79 and extends forwardly and downwardly to rest on the bottom of the groove 81. The gate 82 acts as a guide to direct the roller 80 into the upper portion of the groove 79 on the return stroke of the pusher. As the pusher moves forward, the rollers 80 move the gates upwardly, as shown in Fig. 6, and pass beyond the same into the grooves 81, after which the gates 82 drop downwardly into position on the bottom of the groove 81 to again direct the rollers 80 into the upper portions of the grooves 79.

It is thus seen that the pusher arms 63 move the article 84 through and beyond the cutters onto the delivery apron 47 and then move rearwardly and in so doing, they move upwardly to a height greater than the height of the article and then finally drop downwardly to engage the rear face of the next article 76 that has been moved into slicing position by the conveyor while the preceding article 84 was being sliced.

The articles as they are sliced and moved onto the delivery table 47 by the pusher arms 63, are formed with narrow portions connecting the slices which can be easily broken when it is desired to use the slices.

The sliced articles, when moved onto the delivery table 47, are held in centered position thereon by suitable adjustable guide plates 85 which extend longitudinally of the delivery table 47.

The slicing machine, as previously described, is connected with a suitable wrapping machine. The wrapping machine which is shown in outline only in the drawings, comprises an endless feed conveyor 86 adapted to be operated over rollers 87 and 88, and is driven by a suitable belt 89 from a pulley mounted on a shaft 90.

The supports for the conveyor roller 87 are preferably arranged to lie between the side frames 1 of the slicing machine with the roller 87 positioned adjacent the delivery apron 47 of the slicing machine. The main drive shaft 90 of the wrapping machine is provided with a drive pulley 91 which is preferably adapted to be driven by a belt 92 from a pulley 93 mounted on the shaft 42 of the slicing machine. The conveyors for the wrapping and slicing machines can thus be made to operate at the same speeds so that the operation of slicing and wrapping of the articles, such as bread, cake, and other food stuffs, will be a substantially continuous and sanitary operation since it is not necessary to touch the articles from the time they are fed to the slicing machine until they are removed from the wrapping machine.

The sliced articles are transferred from the delivery apron to the feed conveyor of the wrapping machine by automatic means operated in timed relation with the pusher for the slicing machine. This automatic transferring means simply comprises a pair of spaced carriages 94 slidably mounted on horizontal slide rods 95 carried by the side frames 1 of the slicing machine. The carriages 94 are connected by a transversely extending rod 96 having its ends extending through the carriages and secured thereto by nuts 97, the rod also being provided with rigid collars 98 abutting against the carriages 94 to prevent turning of the same on the guide shafts 95.

Figure 7:
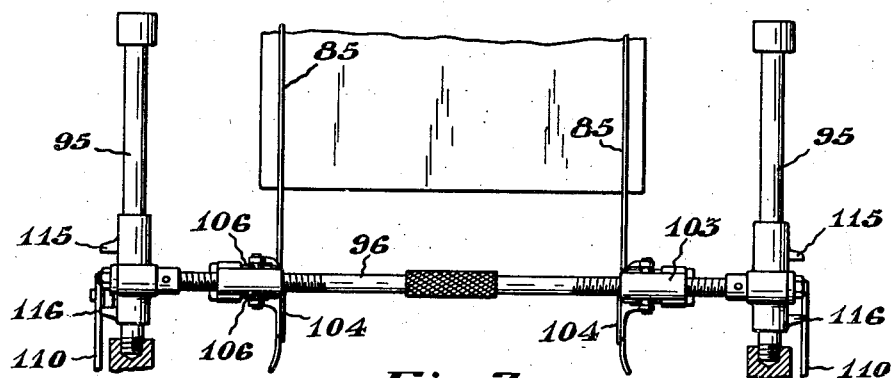
Fig. 7 is an enlarged plan view of the mechanism for transferring the sliced article from the slicing machine to the wrapping machine apron.
Figure 8:
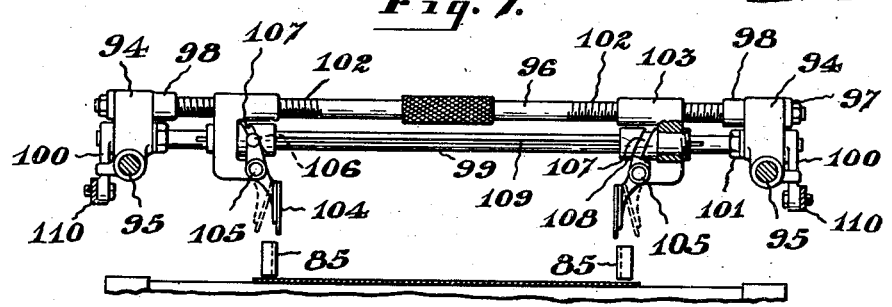
Fig. 8 is a front elevation of the mechanism shown in Fig. 7.

The carriages 94, as shown in Figs. 7 and 8, are further connected by a rod 99 rotatably supported thereby and having crank arms 100 secured to its outer ends and abutting against the outer faces of the carriages 94. Nuts 101 threaded on the rod 99 are also provided to abut against the inner faces of the carriages 94 to prevent end play of the rotatable rod 99.

The rod 96 is formed with opposite threads 102 at each side of its center which extend to the outer ends thereof and which threadably receive a pair of brackets 103 that are slidably positioned on the rotatable rod 99. Each of the brackets 103 has an article engaging pad 104 pivoted to its lower end by a pivot pin 105, which pad 104 is bifurcated at one end and provides oppositely disposed inwardly extending cam followers 106. The cam followers 106 extend toward each other and are guided within grooves 107 formed in the surface of a collar 108 which is rotatably mounted in the brackets 103, but is rigidly mounted on the rod 99. These collars 108 may be formed with integral keys, if desired, which extend into longitudinal grooves 109 formed in the rod 99. It can be seen that by loosening the nuts 97 and rotating the rod 96, the brackets 103 and article engaging pads 104 can be moved away from or toward each other to adjust the pads 104 to different lengths of articles being sliced.

It can also be seen that by rotating the shaft 99, the grooves 107 in the collars 108 will cause the pads 104 to move inwardly and outwardly as shown by the dotted positions of the pads in Fig. 8.

Figure 2:
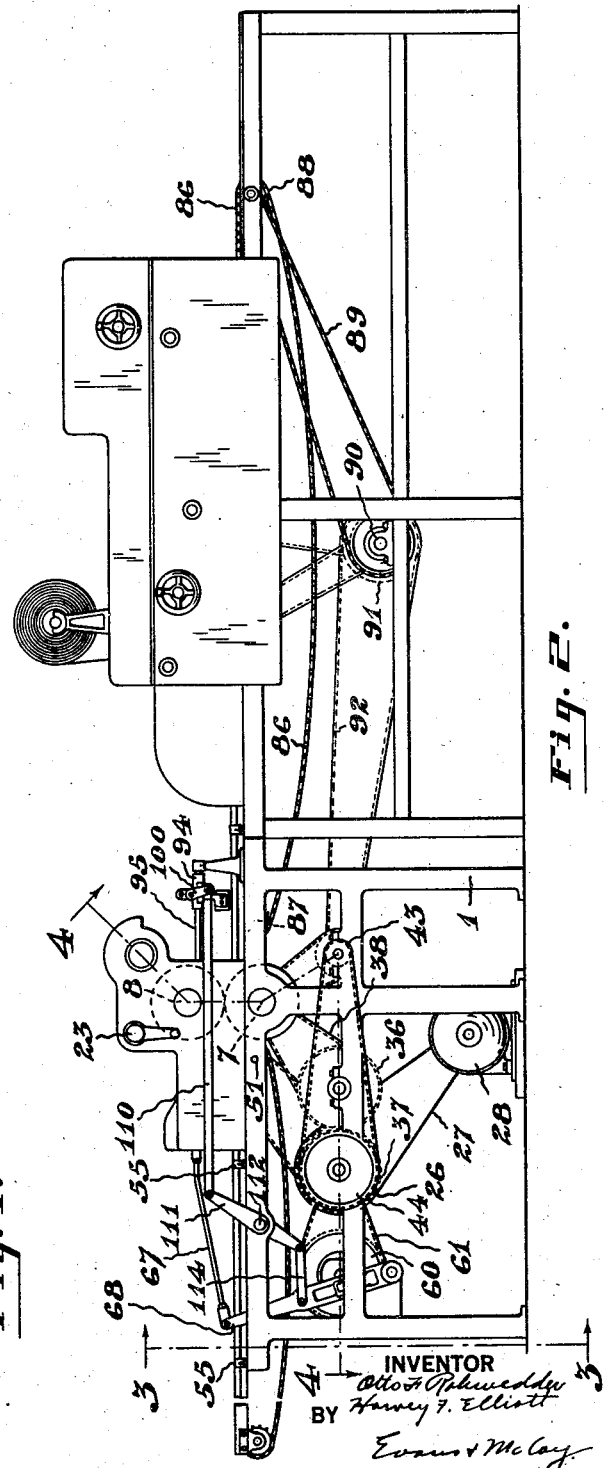
Fig. 2 is a side elevation of the machines shown in Fig. 1.

The rotating movement is imparted to the rod 99 by means of links 110 which are pivoted to the levers 100 and to levers 111 mounted upon a shaft 112, as shown in Fig. 2, which is provided with depending levers 113 that are connected by links 114 to the pusher operating levers 68. The degree of rotational movement of the rod 99 is limited by rearward and forward lugs 115 and 116 formed on the carriages 94 with which the carriage levers are adapted to engage. When the levers engage the forward lugs 116, as shown in Figs. 7 and 8, the article engaging pads 104 assume the article-engaging position shown in Fig. 8, and the distance between the same is slightly less than the distance between the article guides 85. As the pusher moves forward, the rod 99 is caused to rotate and the levers 100 engage the rearward stops 115 thereby causing the pads 104 to swing outwardly and release the article engaged thereby, and then, further movement moves the carriages 94 rearwardly on the rods 95 until the pusher has moved completely through the cutters and the carriages are adjacent the cutters, as shown in Fig. 5. Now as the pushers are retracted, the pressure pads 104 move inwardly to clamp the sliced article and then, as the levers 100 engage the forward stops 116, the sliced article is carried forward by the movement of the carriages 94 on the guide rods 95, and deposited on the feed conveyor 86 of the wrapping machine.

The operation of the apparatus of the present invention can best be understood by giving a complete description of the same from the instant of placing the same in motion.

When the apparatus is in motion, the rotary cutters of each series rotate in opposite directions with respect to the other, and also in opposite directions with respect to the adjacent blades in the same series, and furthermore rotate at a relatively high speed. The feed conveyors of the slicing and wrapping machines operate at the same relatively low speed, and the pusher and transferring devices are operated in timed relation with the feed conveyors.

Assuming that bread is to be sliced in the apparatus of the present invention, the loaves are placed on the apron 46 of the feed conveyors at the rear end thereof, either automatically or manually, and the first loaf is engaged by the cross slats 53, and the successive loaves by successive slats. The first loaf 84 is engaged by the pusher ends 66 and moved through the rotary cutters onto the delivery table 47, and while it is being sliced a second loaf 76 is being moved up to the cutters. By the time the loaf 84 is sliced and moved onto the table 47, the transfer pads 104 have moved to the position shown in Fig. 5, and as the pusher arms 63 move rearwardly and follow around the upper portion of the guiding grooves 79 to clear the top of the loaf 76, the pressure pads 104 grip the loaf 84, compress it and move it forwardly onto the feed conveyor 86 just as one of the slats thereof moves around the rear conveyor roller 87. As the pusher guide-rollers 80 clear the high end of the groove 79 and start to move forwardly, at the same time causing the pusher heads 66 to drop back of the loaf 76 to engage the same, the pressure pads 104 release the loaf 84, and the loaf continues into the wrapping machine to be wrapped. The pushers 66 then move forwardly in a straight line to feed the loaf 76 to the rotary cutters, and meanwhile, the carriages 94 for the pressure pads 104 are retracted so that they will be in position to transfer the loaf 76 to the feed conveyor of the wrapping machine, as soon as it is sliced.

It is to be particularly noted that the adjacent rotary cutters in each series rotate in opposite directions in order to prevent crushing of the article being sliced, which is a very important feature in the slicing of such articles as bread, cake and other food stuffs having relatively soft interiors.

It is also to be noted that a unique means is provided for feeding the articles to be sliced to the rotary cutters, which cooperates with the slicing machine in such a manner that a wrapping machine can easily be incorporated therewith. Furthermore, it is obvious that articles can be sliced considerably more rapidly than has been heretofore accomplished, and that the operation of slicing and wrapping is substantially continuous which results in the saving of time and the reduction of manual labor.

It is obvious that the present invention provides a sanitary method of slicing food materials because manual handling of the articles is eliminated.

It is to be understood, however, that the present invention is not limited to the use of two series of spaced rotary cutters, but also contemplates the use of a single series of cutters mounted on a single shaft, wherein the articles can be completely sliced.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What we claim is:

1. In a slicing machine, a shaft, a series of spaced rotary cutters securely mounted on said shaft, means for rotating said shaft, a rotary cutter rotatably mounted on said shaft between each pair of said first mentioned cutters, and means for rotating said last mentioned cutters independently of and in a direction opposite to said first mentioned cutters.

2. In a slicing machine, a shaft, a series of spaced rotary cutters securely mounted on said shaft, means for rotating said shaft, a second series of rotary cutters rotatably mounted on said shaft, each of said second series being mounted between a pair of said first series, and means for rotating said second series in a direction opposite to said first series.

3. In a slicing machine, a shaft, a series of rotary cutters mounted on said shaft, means for rotating adjacent cutters in opposite directions, a second shaft, a second series of cutters mounted on said second shaft, each lying in the same plane as a corresponding cutter in said first mentioned series, and means for rotating adjacent cutters of said second series in opposite directions.

4. In a slicing machine, a shaft, a series of rotary cutters mounted on said shaft, means for rotating adjacent cutters in opposite directions, a second shaft, a second series of cutters mounted on said second shaft, each lying in the same plane as a corresponding cutter in said first mentioned series, and means for rotating adjacent cutters of said second series in opposite directions, the adjacent edges of the cutters lying in the same plane being movable in the same direction.

5. In a slicing machine, a series of rotary cutters, a second series of rotary cutters, each cutter thereof being aligned with a corresponding cutter of said first series, the cutters of said series being rotatable in opposite directions, and adjacent cutters of each of said cutters being rotatable in opposite directions.

6. A bread slicing machine comprising a frame, a cutter shaft revolvably mounted in the frame, a plurality of fixed cutters united to the cutter shaft, a plurality of loose cutters revolvably mounted on the cutter shaft in alternation with the fixed cutters, and means for driving the fixed and loose cutters on the shaft in opposite directions.

7. A rotary bread slicing machine comprising a frame, a pair of opposed upper and lower cutter shafts revolvably mounted in the frame, each of the cutter shafts having a plurality of fixed cutters united thereto and a plurality of loose cutters revolvably mounted thereon in alternation with the fixed cuters, the cutters upon the opposed shafts being mounted to revolve in the same planes, and means for driving the fixed and loose cutters on each shaft in opposite directions.

8. A rotary bread slicing machine comprising a frame, a pair of opposed upper and lower cutter shafts revolvably mounted in the frame, each of the cutter shafts having a plurality of fixed cutters united thereto, bushings mounted on the cutter shafts in alternation with the fixed cutters, loose cutters revolvably mounted upon the respective bushings, the cutters upon the opposed shafts being mounted to revolve in the same planes, and means for driving the fixed and loose cutters on each shaft in opposite directions.

9. A rotary bread slicing machine comprising a frame, a pair of opposed cutter shafts revolvably mounted in the frame, a plurality of fixed cutters united to each of the cutter shafts respectively, a plurality of loose cutters revolvably mounted upon the cutter shafts in alternation with the fixed cutters, the cutters upon the opposed shafts being mounted to revolve in the same planes, and means for driving the fixed and loose cutters on the opposed shafts in opposite directions.

OTTO F. ROHWEDDER.
HARVEY F. ELLIOTT.